Aug. 16, 1938.  S. T. LIEM  2,127,123
CUSHIONING OF AUTOMOBILES OR LIKE VEHICLES
Filed June 4, 1935
FIG:1
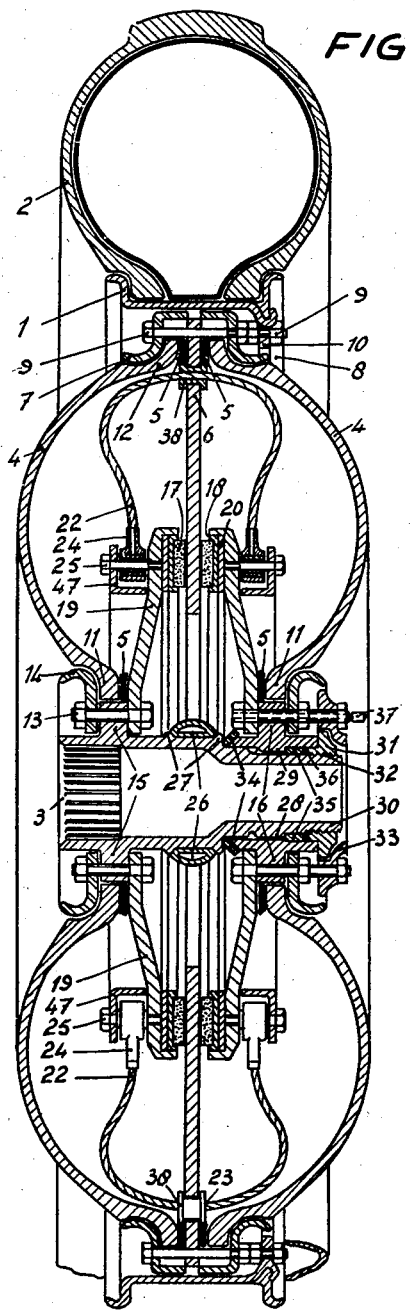
FIG:3
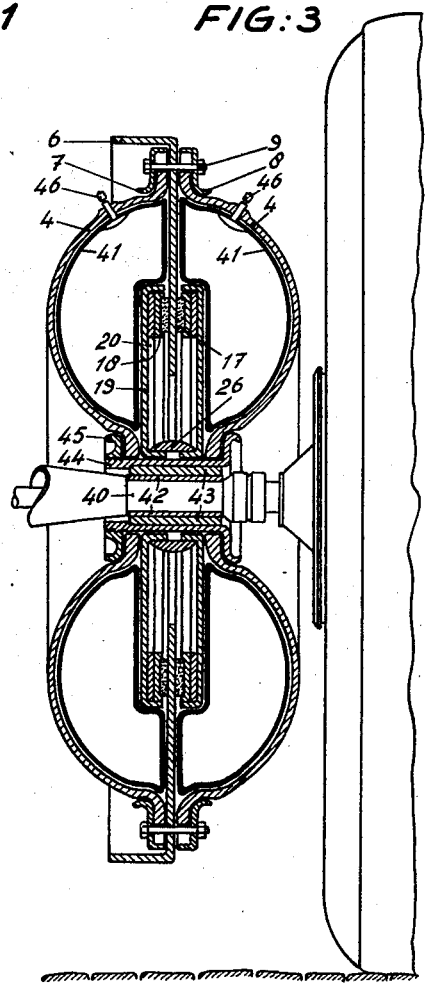
FIG:2
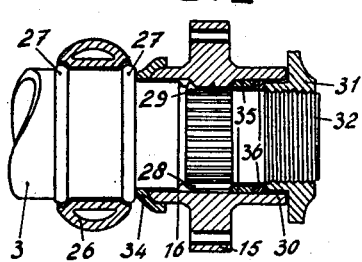
INVENTOR
SEE THIE LIEM
BY *Haseltine, Lake & Co.*
ATTORNEYS.

Patented Aug. 16, 1938

2,127,123

UNITED STATES PATENT OFFICE 2,127,123

CUSHIONING OF AUTOMOBILES OR LIKE VEHICLES

See Thie Liem, The Hague, Netherlands

Application June 4, 1935, Serial No. 24,805
In the Netherlands March 30, 1935

5 Claims. (Cl. 152—41)

The present invention relates to a special method and means for conveniently adjusting guide members of a cushioning device for an automobile or like vehicles, such as motor cycles, bicycles and the like, and vehicles travelling on rails. According to parent application No. 755,410 the frame of the vehicle is cushioned with respect to the running wheels by the arrangement of one or more low-pressure air chambers, for example of annular form, consisting of resilient material, such for example as rubber, the arrangement being such that the walls moving during the flexing action of the parts of the vehicle frame or of the running wheels connected therewith are so guided by a disc-shaped guide plate and associated guide members inside a low-pressure air chamber that lateral displacement of the parts during the flexing action is prevented and only a movement in the direction of the active force is permitted.

The present invention concerns a further improvement of this cushioning arrangement. According to the invention, this improvement resides in that at least partly accessible means are provided for adjusting the guide members of the plate from the outside in the direction of the axle of the wheel.

The invention also relates to means effecting the adjustment, comprising a nut provided on the hub, capable of displacing one of the guide members of the disc-shaped plate in the axial direction.

The present invention further relates to an annular shock-absorbing cushion of elastic material being provided about the hub in the low-pressure air chamber, against which cushion the disc-shaped guide plate may strike with its inner edge when flexed.

According to the present invention a layer of compact graphite may be provided between the disc-shaped guide plate and the associated guide members.

Said graphite layer may include a number of segments mounted upon supports and together forming a ring, said segments being supported with respect to their supports by elastic means such as a member of rubber.

The invention is illustrated in the accompanying drawing, which shows constructional examples of the invention and in which Figure 1 is an axial cross-section in the case of a construction in which the low-pressure air chamber is arranged between the rim and the hub of the wheel, Figure 2 shows in perspective a construction in which parts are cut away for the sake of clearness, and Figure 3 shows on a smaller scale a cross-section of a form of construction in which the low-pressure air chamber is arranged between the under-frame of the vehicle and the running wheel axle.

In the axial cross-section shown in Figure 1, the arrangement of a low-pressure chamber between the hub and the rim of a running wheel is shown. The rim of the wheel is designated by 1, and the tyre by 2, the tyre being preferably formed by an ordinary high-pressure pneumatic tyre arranged on the rim 1. The wall of the low-pressure chamber arranged between the rim 1 and the hub 3 is designated by 4. This low-pressure air chamber is constructed in this instance with a single wall, so that no use is made of an inner chamber. The wall of the air chamber consists of two symmetrical halves, the edges of which are clamped in an airtight manner with the aid of rubber packings 5, this being effected on their outer edge on either side of the disc-shaped plate 6 which serves for straight guiding by means of a clamping ring in two parts arranged on the rim 1 of the running wheel. One part 7 of this clamping ring is provided with bolts 9 projecting laterally, that is to say parallel to the axle of the wheel, and provided with a screw-thread, the bolts extending through corresponding holes in an outwardly directed edge 10 or lugs provided on the rim. The inner edges 11 of the air chamber walls 4 are clamped in an air-tight manner similarly to the outer edges 12, use also being made of rubber packings 5 bearing against the edge of the low-pressure chamber. The inner wall of the air chamber is firmly clamped with this rubber packing between a flange of the hub 3 and a ring 14 which is held tight from the outside against this flange by means of studs 13. In the construction illustrated, the flange 15 forms on the right-hand side of the plane of symmetry a part of a special bush 16 enclosing the actual hub 3.

The plate 6, whose plane of symmetry coincides with that of the running wheel is, upon movement, guided under the influence of the flexing action between two graphite rings 17 arranged concentrically to the plate 6, the said graphite rings being composed of a number of segments. These graphite segments are arranged in holders 18 of U-shaped cross-section, which are carried by supports 19 moving apart in the direction of the axle. The supports 19 are in the form of somewhat conically shaped plates which transmit the pressure exerted by the plate 6 to the hub, the inner edge of these supports being secured to the inner side of the flange 15 of the hub. Between the graphite rings 17 or between their holders 18 and the supports 19, rubber inserts 20 are provided which render possible a lateral flexing of the graphite rings 17 under the influence of pressure exerted thereon by the disc-shaped plate 6. Instead of rubber inserts, metallic springs may also be used for this purpose.

The supports 19 for the graphite rings are provided with studs 25 which are distributed over the circumference of each of these supports and permit the fixation of steel cables 22. The steel cables are guided through apertures 23 in proximity to the circumference of the disc-shaped plate 6. Their ends are connected with the studs 25, intermediate layers of rubber 24 ("silent blocks") being used. The structure is reinforced by a ring 47 of annular cross section. The cables 22 are preferably guided, at the point where they pass through the apertures in the plates 6, by guide sleeves 38 of a suitable artificial resin substance or other material suitable for this purpose which is proof against temperature and pressure. In this manner, the disc-shaped plate 6 is consequently connected by a number of steel cables 22 with the support 19. These cables 22 are not extended under normal circumstances in the construction illustrated in the drawing. When the vehicle is started or braked, however, they are tightened and then transmit the forces, whereby the walls 4 of the low-pressure air chamber are relieved of load. Consequently, these walls may be made considerably lighter than would otherwise be the case.

In order to intercept shocks which may be transmitted by the guide plate 6 to the hub 3 in the case of too heavy a flexing, an annular shock-absorbing cushion 26 is provided in the centre of the hub in the low-pressure chamber. This cushion is of flexible or elastic material, for example rubber, and may be made either hollow or solid. In the case of the construction illustrated in the drawing, this shock-absorbing cushion is arranged between two annular edges 27 provided on the hub, whereby a lateral displacement thereof is prevented.

The regulation of the distance apart of the guide members between which the guide plate 6 is situated, and of the pressure with which the graphite rings bear against this guide plate, takes place in the following manner:—the flange 15 of the hub 3 situated on the outer side of the running wheel is not rigidly connected with this hub, but with a special bush 16, which is displaceable in the axial direction with respect to the hub. In order to prevent this part from turning with respect to the hub, this bush engages with an inner toothed crown 29 extending in the axial direction in corresponding teeth 28 on the hub 3. An annular nut, which is screwed onto the screw-thread provided on the outer end 32 of the hub, presses, when tightened, against the annular extension 30 of the bush 16. When the annular nut 31, which may be secured by an outer ring 33, is tightened, an inwardly directed displacement of the right-hand support and consequently of the right-hand graphite ring 17 is brought about, so that the guide plate 6 is clamped more securely between the graphite rings 17. In this way, the pressure with which these rings bear against the guide plates is easily regulatable from the outside without it being necessary to remove any parts. In order to prevent any escape of air between the hub 3 and the bush 16 fitted over it, a packing ring 34 of rubber is provided between the right-hand rib 27 on the hub and the bush 16. Furthermore, there is provided between these parts 3 and 16 a packing ring 35 on which the nut 31 or a ring 36 arranged beneath it can exert a pressure. In this manner, a reliable double packing of the low-pressure air chamber with respect to the outside air is obtained.

The air valve for the low-pressure air chamber is designated by 37 in the drawing (Figure 1) and is preferably combined with one of the securing bolts 13 by which the clamping rings 14 are secured on the flange 15 of the hub.

The advantages afforded by the construction according to the invention are very considerable. For example, when using the new arrangement the advantage of a perfectly symmetrical construction is obtained, while in addition the graphite rings are enclosed free from dust and in a watertight manner in the low-pressure air chamber and nevertheless an accurate adjustment of the pressure with which these graphite rings bear against the disc 6 is possible from the outside in an extremely simple manner. Furthermore, with this construction the setting up of undesirable forces (torsion) in the walls of the low-pressure air chamber is prevented, whereby the life of the wheel is prolonged and the arrangement may be more lightly constructed.

In the case of the arrangement illustrated in Figure 3 of the drawing, wherein the low-pressure chamber is arranged between the under-frame of the vehicle and the wheel axle 40, inner pneumatic tubes 41 are used. In this construction, it is presumed that the construction of the air chamber walls are sufficiently resistant per se in order to render unnecessary the steel cables 22 provided in the construction according to Figure 1. Corresponding parts are indicated in Figure 3 with the same reference characters as in Figures 1 and 2.

In this constructional form, the hub 3 is secured, with all parts arranged thereon, to the bush 42 by means of an elastic ring 43 of rubber or similar resilient material, which is arranged about the hub bush. This method of arrangement produces a cardan-like movability of the whole. The edges of the air chamber walls 4 are here clamped between a flange 44 of the hub or an annular nut 45 screwed on this hub, on the one hand, and the supports 19, on the other hand, which serve to press the graphite rings against the disc-like plate 6, which is made in one with one of the longitudinal girders of the frame or is securely connected thereto. 46 are the valves of the two inner air tubes.

What I claim is:—

1. In a pneumatic cushioning device for a vehicle, one or more annular low pressure air chambers of elastic material, spaced guide members, each chamber having a disc-shaped guide plate guided by said guide members in a plane vertical to the wheel axle, so that lateral deviation during the flexing is prevented, said disc-shaped guide plate or plates and the associated guide members being arranged inside the low-pressure air chamber, means being provided for adjusting the guide members of the plate from the outside in the direction of the axle of the wheel.

2. In a pneumatic cushioning device for a vehicle, one or more annular low pressure air chambers of elastic material having spaced guide members within the same, and one or more disc-shaped guide plates guided by said guide members in a plane vertical to the wheel axle, the guide members for the disc-shaped guide plate or plates being adjustable from the outside in the direction of the axle of the running wheel, an annular shock-absorbing cushion of elastic material being provided about the hub in the low-pressure air chamber, against which cushion the disc-shaped guide plate may strike with its inner edge when flexed.

3. In a pneumatic cushioning device for a vehicle, the combination of one or more annular low pressure air chambers of elastic material having spaced guide members within the same each chamber having a disc-shaped guide plate guided by said guide members in a plane vertical to the wheel axle, and the guide members for the disc-shaped guide plate or plates being adjustable from the outside in the direction of the axle of the running wheel, and exteriorly accessible means for effecting the adjustment in assembled condition of the device comprising a nut provided on the hub exteriorly of said air chamber and capable upon being manipulated of displacing one of the guide members of the disc-shaped plate in the axial direction.

4. In a pneumatic cushioning device for a vehicle, one or more annular low pressure air chambers of elastic material having spaced guide members within the same, each chamber having a disc-shaped guide plate guided by said guide members in a plane vertical to the wheel axle, the guide members for the disc-shaped guide plate or plates being adjustable from the outside in the direction of the axle of the running wheel, and a layer of compact graphite being provided between the disc-shaped guide plate and the associated guide members.

5. In a pneumatic cushioning device for a vehicle, one or more annular low pressure air chambers of elastic material having spaced guide members within the same, and one or more disc-shaped guide plates guided by said guide members in a plane vertical to the wheel axle, the guide members for the disc-shaped guide plate or plates being adjustable from the outside in the direction of the axle of the running wheel, a layer of compact graphite being interposed between the disc-shaped guide plates and the associated guide members, and said graphite layer including a number of segments mounted upon supports and together forming a ring, said segments being supported with respect to their supports by elastic means such as a member of rubber.

SEE THIE LIEM.